(12) United States Patent
Yangbin

(10) Patent No.: US 7,345,817 B2
(45) Date of Patent: Mar. 18, 2008

(54) CERAMIC COATING FOR PARTS OF A MICROSCOPE

(75) Inventor: Qu Yangbin, Shanghai (CN)

(73) Assignee: Leica Microsystems CMS GmbH, Wetzlar (DE)

( * ) Notice: Subject to any disclaimer, the term of this patent is extended or adjusted under 35 U.S.C. 154(b) by 42 days.

(21) Appl. No.: 10/908,119

(22) Filed: Apr. 28, 2005

(65) Prior Publication Data

US 2006/0039063 A1 Feb. 23, 2006

(51) Int. Cl.
G02B 21/24 (2006.01)
G02B 21/00 (2006.01)
(52) U.S. Cl. .................... 359/398; 359/368; 359/391
(58) Field of Classification Search ........ 359/368–390, 359/391–395, 894, 896
See application file for complete search history.

(56) References Cited

U.S. PATENT DOCUMENTS 4,445,758 A * 5/1984 Emmel .................... 359/392
5,781,338 A    7/1998 Kapitza et al. ............. 359/398
6,007,929 A * 12/1999 Robertson et al. ........ 428/195.1
6,426,790 B1 * 7/2002 Hayashi ...................... 355/72

FOREIGN PATENT DOCUMENTS

JP      6-308392    * 11/1994  ................. 359/391
JP      2002-207176 *  7/2002  ................. 359/392

OTHER PUBLICATIONS

English Abstract of the reference RU 2,224,828 C2.
English Abstract of the reference RU 2,199,613 C2.
English Abstract of the reference RU 2,147,324 C1.
English Abstract of the reference No. 2,070,622 C1.
English Abstract of the reference No. 10-253641.
English Abstract of the reference No. 06-308392.

* cited by examiner

Primary Examiner—Thong Q Nguyen
(74) Attorney, Agent, or Firm—Simpson & Simpson, PLLC

(57) ABSTRACT

A microscope is disclosed which comprises several parts, such as a stand, a stage, a nose piece and several elements used to operate the microscope. At least one of these parts is provided with the ceramic layer on its surface.

13 Claims, 4 Drawing Sheets

CERAMIC COATING FOR PARTS OF A MICROSCOPE

FIELD OF THE INVENTION

The present invention relates generally to microscopes; and more particularly; to a ceramic coating for parts of a microscope.

Painting is the general method used on various parts of a microscope. The scratch resistance of the parts painted or coated in a conventional way is not very satisfactory. Other traditional technologies, such as chrome plating, anodisation or spraying of teflon also do not provide the required features.

BACKGROUND OF THE INVENTION

The Russian patent RU 2224828 discloses a method of microarc oxidation and a device for its realisation. Nothing is disclosed about the use of the part made by the process disclosed in the above document.

Another patent application RU 2199613 discloses anti-corrosive coatings for components of stop valves. The parts of the valves include the application of an aluminium layer or that of an anodised aluminium containing alloy upon which a layer of microarc oxidation material is applied. The components covered with such a coating show a high strength, mechanical endurance, corrosion resistance, adhesion, microhardness, resistance to cyclic temperature variations and resistance against organic solvents. The above disclosure does not show any application of a layer produced by microarc oxidation for microscopic parts.

The document RU 2147324 shows the application of microarc oxidation on body parts of gear-type pumps. No application for optical instruments, such as microscopes, is mentioned or disclosed in the above document.

BRIEF SUMMARY OF THE INVENTION

The object of the present invention to provide a coating for parts of a microscope which show a high scratch resistance and provide a good contrast compared to the other parts of the microscope. The above object is solved by a microscope which comprises several parts wherein the parts are for example a stand, a stage, a nose piece and several elements used to operate a microscope. At least one part of the microscope is provided with a ceramic coating. It is advantageous if the ceramic coating is provided on a part which is made of an aluminium alloy. It is extremely advantageous if the part with the ceramic coating is the upper stage element. It is of importance if the ceramic coating is provided on an insert which fits in a recess on the upper stage element. The ceramic coating is a microarc coating. The hardness of the layer of the ceramic coating is related to the thickness of the layer. The ceramic coating can be produced in different colours so that the part on which the ceramic coating is provided differs from the other parts of the microscope. It is especially advantageous in the case where the upper stage element is black and the colour of the ceramic coating on the insert is of a different colour so that the ceramic coating provides a good contrast between the upper stage element and the insert. It is clear to every person skilled in the art that a ceramic coating can also be provided on the insert and on the upper stage element wherein both ceramic coatings are of different colours. The ceramic coating is extremely scratch resistant. In addition, the ceramic coating is resistant to organic solvents, acids and bases.

Therefore, what is needed is a microscope stage including a means for creating contrasts between a microscope stage and a specimen, such that the specimen may be orientated correctly on the stage prior to insertion into the optical path. In addition, the upper stage or at least the insert in the upper stage has to be scratch resistant in order to avoid wear on the stage or the insert due to intensive use of the microscope.

BRIEF DESCRIPTION OF THE DRAWINGS

These and other objects, features and advantages of the invention will become readily apparent to one having ordinary skill in the art upon study of the following detailed description in view of the drawings and appended claims.

DETAILED DESCRIPTION OF THE INVENTION

At the outset it should be noted that the same reference numbers on different figures represent similar structural elements. It should also be appreciated that, while a number of different embodiments and variations of the present invention are shown in the various drawings, the invention disclosed it is not intended to be limited to these specific embodiments as the claims define a broader invention that can take many different shapes and structures. Finally, in the present disclosure and claims, it should be appreciated that the terms insert and/or plate are not intended to be limited to the removable plate-like structures as illustrated in the present figures, but may include other parts of the microscope that require a ceramic coating on their surfaces.

Figure 1:
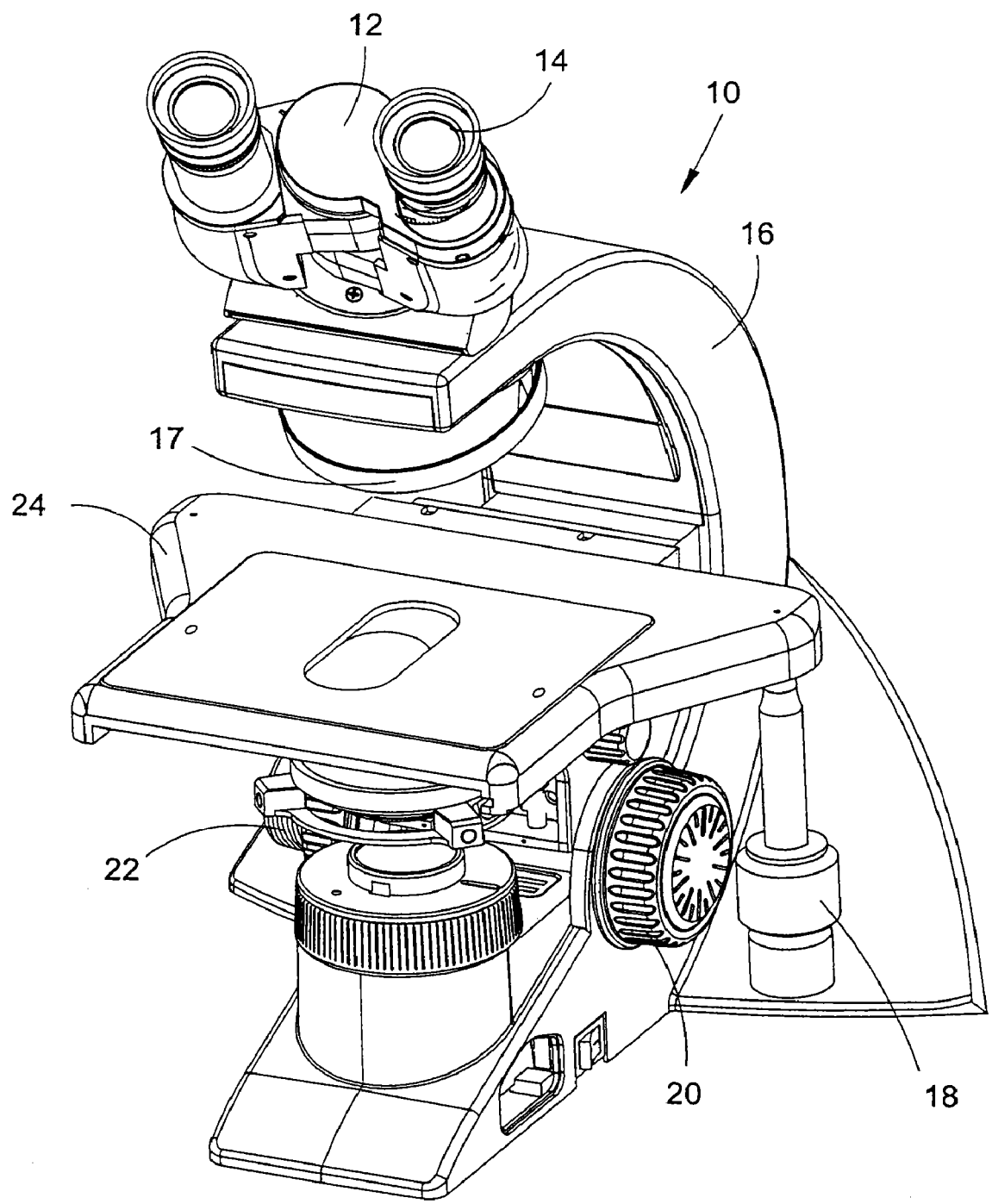
FIG. 1 is a perspective view of a microscope comprising a microscope stage, contrasting means according to the present invention.

FIG. 1 shows a perspective view of a microscope 10 comprising a microscope stage 24 and a removable insert 28. In addition, the microscope comprises a binocular head 12, an eyepiece 14, a stand 16, an objective turret or nose piece 17, a stage drive control 18, coarse focus adjustment knob 20, fine focus adjustment knob 22 and the stage assembly 24. In this embodiment, the stage assembly 24 is generally adjustable in left/right and forward/backward directions via the stage drive control 18 and stage drive means (not shown).

Figure 2:
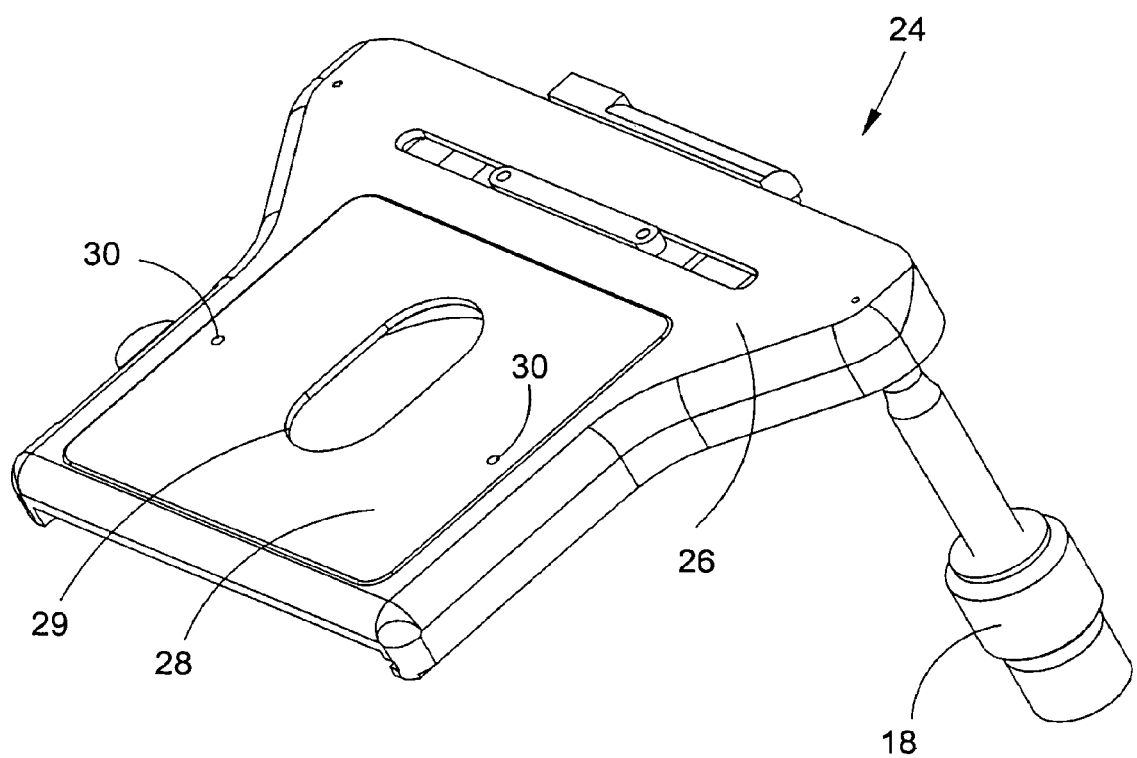
FIG. 2 is a perspective view of a microscope stage according to the present invention.
Figure 3:
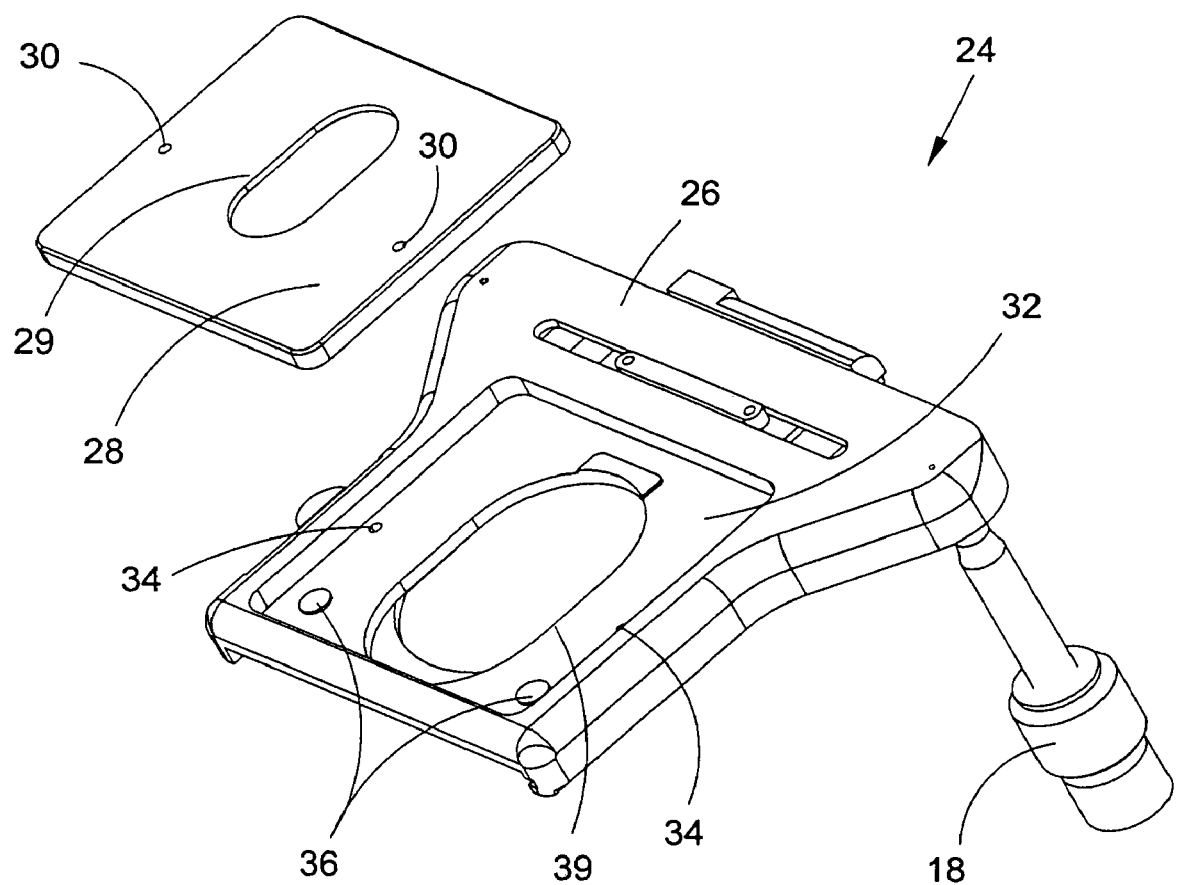
FIG. 3 is an exploded perspective view of the microscope stage of FIG. 2.

Referring now to FIGS. 2 and 3, stage assembly 24 of the present invention broadly comprises an upper stage element 26, which additionally includes contrasting stage insert 28. In a preferred embodiment, upper stage element 26 is black, and more preferably flat black, for purposes of limiting the incidence of light that might be reflected off the stage and into the optical beam path. The upper stage element 26 could, however, comprise a different colour if desired. Typically, the upper stage element 26 is made of aluminium or of an aluminium alloy that is anodised and painted to provide a flat black colour. Optional stage insert 28 is preferably made of an aluminium alloy as well and is of a lighter colour than the upper stage element 26. The contrasting stage insert is, thus configured, for providing a good contrast between a specimen and the contrasting stage insert 28 when the specimen is placed thereon. In addition to the lighter colour of the stage insert 28 or the lighter colour of the upper stage element 26, the surfaces of both elements may be provided with a ceramic coating. The ceramic coating has the properties that it is of lighter colour than a black element surrounding it, that it is scratch resistant and that is resistant to organic solvents, acids and bases. As already mentioned, the ceramic coating may be provided on different parts of the microscope, such as the stand, the upper stage element 26 or the stage insert 28. The ceramic coating is a microarc oxidation coating. The stage insert 28 also comprises an aperture 29, which allows light to pass through for performing microscopic methods. The scratch resistance of the stage insert 28 or the whole stage upper element 26 is of great benefit to a microscope, since there is no wear of the surfaces of the stage insert 28 or the upper stage element 26 due to the intense use by the persons working with the microscope.

As shown more clearly in FIG. 3, the stage assembly of the present invention is operatively arranged that the contrasting stage insert 28 is removable from the upper stage element 26. In such an embodiment, upper stage 26 comprises a recess 32 which is configured for accepting a complementarily shaped stage insert 28, which in this embodiment is removable from the upper stage element 26. For purposes of correctly aligning the stage insert 28 therein, recess 32 comprises an alignment means 34, which may comprise a pair of pins of nubs operatively arranged for mateable fit with bores 30 of the contrasting stage insert 28. Of course, other means for ensuring the proper alignment of the stage insert 28 with recess 32 are contemplated, for example, notches, keyways or the like could be used to ensure a correct fit of the stage insert 28 in the recess 32. FIG. 3 also illustrates that recess 32 further comprises fastening means 36 for securing the stage insert 28 in the recess 32. Fastening means 36 may comprise magnets, hook and loop type fasteners, detents, spring ball bearings, etc. Finally, recess 32 comprises aperture 39, which is larger than aperture 29 of the stage insert 28 allowing the stage insert 28 to be easily removed from the recess from below the upper stage element 26.

Figure 4:
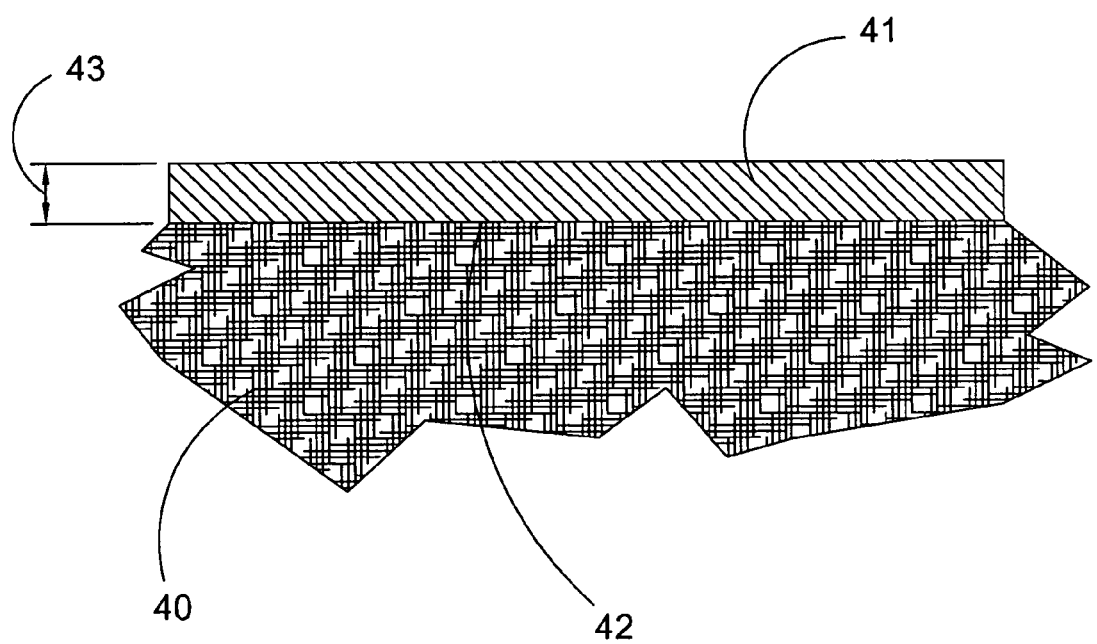
FIG. 4 is a cross-sectional side view of the insert showing the ceramic coating provided as a layer on the surface of the insert.

FIG. 4 shows a partial cross-sectional view through a part of a microscope provided with a ceramic layer 41. The part of the microscope 40, which may be a stand portion, a focussing knob, an upper stage element 26 or a stage insert 28, has a surface 42 on which the ceramic coating layer 41 is provided. The part 40 is made of a metal and preferably of aluminium or of an aluminium alloy. The ceramic coating layer 41 combines with the base material of the part 40, therefore, the part will show no crusting or spalling during the course of its use. The ceramic layer 41 is formed through physical action, thus the filming speed is several times faster than in conventional technology such as spraying or painting. Additionally, the thickness 43 of the ceramic layer 41 can be adjusted according to the requirements which leads to a further enhancement of the hardness of the parts. The resulting hardness is related to the thickness of the ceramic layer 41. Additionally, the colour of the part can be treated into pure white, beige, coffee or black during the course of oxidation. Moreover, the ceramic coating layer 41 will not fade even if organic solvents, such as alcohol, acetone, ditoluene and the like are used. The part, on which the ceramic layer 41 is provided, is treated by microarc oxidation. Microarc oxidation has the advantage that during or after the process the part is not deformed. Additionally, the resulting surface of the ceramic layer 41 has an excellent scratch resistance and corruption resistance. The ceramic layer 41 can be applied to the part of the microscope with a thickness 43 ranging from 30 μm to 50 μm.

Moreover, as mentioned above, the ceramic layer 41 was not attacked by chemicals. The hardness of the ceramic layer 41 ranges from Vickers hardness (HV) 500-2500, wherein the hardness is related to thickness of ceramic layer 41.

Thus, it is seen that the objectives of the present invention are effectively achieved, although modification and changes to the invention should be readily apparent to those having ordinary skill in the art, which modifications are intended to be within the spirit and scope of the invention as claimed.

What is claimed is:

1. A microscope comprises several parts, wherein the parts are a stand, a stage, a nosepiece, a coarse focus adjustment knob, a fine focus adjustment knob, an upper stage element, and a stage insert, and at least one of the parts of the microscope is provided with a layer of a microarc oxidation ceramic coating, wherein said ceramic coating is grown into said at least one part and includes an oxide compound formed from the at least one part.

2. The microscope as claimed in claim 1, wherein the at least one of the parts provided with the layer of the ceramic coating is made of an aluminium alloy.

3. The microscope as claimed in claim 1 wherein the at least one of the parts provided with the layer of the ceramic coating is the upper stage element.

4. The microscope as claimed in claim 3 wherein the at least one of the parts provided with the layer of the ceramic coating is the insert, wherein the insert is provided in a recess of the upper stage element.

5. The microscope as claimed in claim 1 wherein the hardness of the layer of the ceramic coating is related to the thickness of the layer.

6. The microscope as claimed in claim 1 wherein the layer of the ceramic coating has a different color than the remaining parts among the several parts of the microscope.

7. The microscope as claimed in claim 1 wherein the at least one of the parts includes the stage insert, the upper stage element is of black color and the layer of the ceramic coating of the insert is of a different color, so that the layer of the ceramic coating supports color contrast.

8. The microscope as claimed in claim 7 wherein the color of the layer of the ceramic coating of the insert is pure white.

9. The microscope as claimed in claim 7 wherein the color of the layer of the ceramic coating of the insert is beige.

10. The microscope as claimed in claim 1 wherein the layer of the ceramic coating is scratch resistant.

11. The microscope as claimed in claim 1 wherein the layer of the ceramic coating is resistant against organic solvents, acids and bases.

12. A microscope comprises an upper stage element and an insert of the upper stage element of the microscope, wherein the insert is provided with a layer of a microarc oxidation ceramic coating and the insert is positioned in a recess of the upper stage element and wherein the coating is grown into the insert and includes an oxide compound formed from the insert.

13. A microscope comprises an upper stage element and an insert of the upper stage element of the microscope, wherein the insert is provided with a layer of a microarc oxidation ceramic coating and the insert is positioned in a recess of the upper stage element, wherein the upper stage element is of black color and the layer of the ceramic coating of the insert is of a different color, so that the layer of the ceramic coating supports color contrast and the layer of the ceramic coating is scratch resistant and wherein the coating is grown into the insert and includes an oxide compound formed from the insert.

* * * * *